(12) United States Patent
Lauterbach et al.

(10) Patent No.: US 10,647,934 B2
(45) Date of Patent: May 12, 2020

(54) METHODS OF CRACKING A PLATFORM CHEMICAL MIXTURE TO LIQUEFIED PETROLEUM GAS AND AROMATIC HYDROCARBON PRODUCTS

(71) Applicant: UNIVERSITY OF SOUTH CAROLINA, Columbia, SC (US)

(72) Inventors: Jochen A. Lauterbach, Columbia, SC (US); Sungtak Kim, Columbia, SC (US); Erdem Sasmaz, Columbia, SC (US); Michael Mayeda, Columbia, SC (US)

(73) Assignee: University of South Carolina, Columbia, SC (US)

( * ) Notice: Subject to any disclaimer, the term of this patent is extended or adjusted under 35 U.S.C. 154(b) by 68 days.

(21) Appl. No.: 14/593,086

(22) Filed: Jan. 9, 2015

(65) Prior Publication Data

US 2015/0210944 A1 Jul. 30, 2015

Related U.S. Application Data

(60) Provisional application No. 61/925,269, filed on Jan. 9, 2014.

(51) Int. Cl.
*C10L 3/12* (2006.01)
*C10G 3/00* (2006.01)

(52) U.S. Cl.
CPC ............... *C10L 3/12* (2013.01); *C10G 3/49* (2013.01); *C10G 3/50* (2013.01); *C10G 2400/30* (2013.01); *C10L 2200/0469* (2013.01); *C10L 2290/02* (2013.01); *Y02P 30/20* (2015.11)

(58) Field of Classification Search
None
See application file for complete search history.

(56) References Cited

U.S. PATENT DOCUMENTS

2013/0263498 A1* 10/2013 Kania ................. C10L 1/04
44/437
2015/0166899 A1* 6/2015 Shi ..................... B01J 29/072
585/24

OTHER PUBLICATIONS

Stefanidis et al. "Mesopore-modified mordenites as catalysts for catalytic pyrolysis of biomass and cracking of vacuum gasoil processes", Green Chem., 2013, 15, 1647-1658.*
Tsutsui et al., "Conversion of Ethylmethylketone and Levulinic Acid Into Petrochemicals Over ZSM-5 as a Biorefinery Technology", International Journal of biomass & renewables, 1 (2012) 21-26. (Year: 2012).*

(Continued)

*Primary Examiner* — Ali Z Fadhel
(74) *Attorney, Agent, or Firm* — Dority & Manning, P.A.

(57) ABSTRACT

Methods for deriving a low-C hydrocarbon fuel from a platform chemical mixture are provided by introducing the platform chemical mixture to a catalytic material to produce a product stream comprising the low-C hydrocarbon fuel, and separating the low-C hydrocarbon fuel in the product stream from any remaining platform chemicals. Methods for producing aromatic hydrocarbons benzene, toluene, and xylenes from a platform chemical mixture are also provided by introducing a catalytic material to the platform chemical mixture to produce a immiscible liquid product stream comprising BTX, and separating the BTX in the liquid product stream from unreacted platform chemicals via a decanting process.

15 Claims, 4 Drawing Sheets

(56) References Cited

OTHER PUBLICATIONS

Annual Energy Review 2011. DOE, Ed. U.S. Energy Information Administration: www.eia.gov/aer, 2012; pp. 135-194.

Asami, K.; Zhang, Q. W.; Li, X. H.; Asaoka, S.; Fujimoto, K., Semi-indirect synthesis of LPG from syngas: Conversion of DME into LPG. Catal. Today 2005, 106, 247-251.

Bridgwater, A. V., A Survey of Thermochemical Biomass Processing Activities. Biomass 1990, 22, 279-292.

Corma, A.; Iborra, S.; Velty, A., Chemical Routes for the Transformation of Biomass into Chemicals. Chemical Reviews 2007, 107, 2411-2502.

Cortright, R. D.; Davda, R. R.; Dumesic, J. A., Hydrogen from catalytic reforming of biomass-derived hydrocarbons in liquid water. Nature 2002, 418, 964-967.

Davda, R. R.; Shabaker, J. W.; Huber, G. W.; Cortright, R. D.; Dumesic, J. A., A review of catalytic issues and process conditions for renewable hydrogen and alkanes by aqueous-phase reforming of oxygenated hydrocarbons over supported metal catalysts. Appl. Catal., B 2005, 56, 171-186.

Davda, R. R.; Shabaker, J. W.; Huber, G. W.; Cortright, R. D.; Dumesic, J. A., Aqueousphase reforming of ethylene glycol on silica-supported metal catalysts. Appl. Catal., B 2003, 43, 13-26.

D'Sa, A.; Murthy, K. V. N., Energy for Sustainable Development, VIII,. 2004.

Exxonmobil Methanol to Gasoline (MTG) Technology, Gasification Technology Conference, 2009.

Fujimoto, K.; Congming, L.; Xingdong, Y. In Production of Liquefied Petroleum Gas (LPG) from Biomass or Biogas, 9th Biomass Asian Workshop, 2012; pp. 1-20.

Gallezot, P., Catalytic Conversion of Biomass: Challenges and Issues. Chemsuschem 2008, 1, 734-737.

George, W. H.; Iborra, S.; Corma, A., Synthesis of Transportation Fuels from Biomass: Chemistry, Catalysts, and Engineering. Chemical Reviews 2006, 106, 4044-4098.

Haldor Topsoe A/S. www.topsoe.com.

Harris, R. A.; Adams, T.; Hiott, V.; Van Lear, D.; Wang, G.; Tanner, T.; Frederick, J. Potential for Biomass Energy Development in South Carolina; USDA Forest Service and SC Forestry Commission: 2004.

Huber, G. W.; Chheda, J. N.; Barrett, C. J.; Dumesic, J. A., Production of liquid alkanes by aqueous-phase processing of biomass-derived carbohydrates. Science 2005, 308, 1446-1450.

Huber, G. W.; Cortright, R. D.; Dumesic, J. A., Renewable alkanes by aqueous-phase reforming of biomass-derived oxygenates. Angew. Chem. Int. Ed. 2004, 43, 1549-1551.

Huber, G. W.; Dumesic, J. A., An overview of aqueous-phase catalytic processes for production of hydrogen and alkanes in a biorefinery. Catal. Today 2006, 111, 119-132.

Huber, G. W.; Iborra, S.; Corma, A., Synthesis of Transportation Fuels from Biomass: Chemistry, Catalysts, and Engineering. Chemical Reviews 2006, 106, 4044-4098.

Huber, G. W.; Shabaker, J. W.; Dumesic, J. A., Raney Ni—Sn catalyst for H-2 production from biomass-derived hydrocarbons. Science 2003, 300, 2075-2077.

Hulteberg, C.; Brandin, J.; Leveau, A. Green LPG; 2010; pp. 1102-7371.

Nakagawa, Y.; Tomishige, K., Production of 1,5-pentanediol from biomass via furfural and tetrahydrofurfuryl alcohol. Catal. Today 2012, 195, 136-143.

Ogi, T.; Nakanishi, M.; Fujimoto, K. In Synthesis of Bio-LPG from Biomass-derived Syngas, Bioenergy Conference, Vienna, Austria, 2012.

Olcay, H.; Subrahmanyam, A. V.; Xing, R.; Lajoie, J.; Dumesic, J. A.; Huber, G. W., Production of renewable petroleum refinery diesel and jet fuel feedstocks from hemicellulose sugar streams. Energy Environ. Sci. 2013, 6, 205-216.

Perlack, R. D.; Wright, L. L.; Turhollow, A.; Graham, R. L.; Stokes, B.; Erbach, D. C. Biomass as Feedstock for a Bioenergy and Bioproducts Industry: The Technical Feasibility of a Billion-Ton Annual Supply; DOE/GO-102995-2135; Oak Ridge National Laboratory: 2005.

Press release. www.UBE-ind.co.jp.

Qi, D. H.; Bian, Y. Z.; Ma, Z. Y.; Zhang, C. H.; Liu, S. Q., Combustion and exhaust emission characteristics of a compression ignition engine using liquefied petroleum gas-Diesel blended fuel. Energy Convers. Manage. 2007, 48, 500-509.

Shabaker, J. W.; Davda, R. R.; Huber, G. W.; Cortright, R. D.; Dumesic, J. A., Aqueousphase reforming of methanol and ethylene glycol over alumina-supported platinum catalysts. J. Catal. 2003, 215, 344-352.

Shabaker, J. W.; Dumesic, J. A., Kinetics of aqueous-phase reforming of oxygenated hydrocarbons: Pt/Al2O3 and Sn-modified Ni catalysts. Ind. Eng. Chem. Res. 2004, 43, 3105-3112.

South Carolina Residential Energy Consumption. DOE, Ed. Energy Efficiency and Renewable Energy: http://apps1.eere.energy.gov/states/residential.cfm/state=SC, 2013.

U.S. Exports of liquefied petroleum gas projected to continue through 2040; Energy information Administration: 2013.

U.S. Propane Residential Price by All Sellers; Energy Information Administration: 2012.

World LPG Market Outlook; Purvin & Gertz and Energy Information Administration: 2012.

Zhang, Q. W.; Li, X. H.; Asami, K.; Asaoka, S.; Fujimoto, K., Synthesis of LPG from synthesis gas. Fuel Process. Technol. 2004, 85, 1139-150.

\* cited by examiner

METHODS OF CRACKING A PLATFORM CHEMICAL MIXTURE TO LIQUEFIED PETROLEUM GAS AND AROMATIC HYDROCARBON PRODUCTS

PRIORITY INFORMATION

The present application claims priority to U.S. Provisional Patent Application Ser. No. 61/925,269 titled "Methods of Cracking a Platform Chemical Mixture to Liquefied Petroleum Gas and Aromatic Hydrocarbon Products" of Lauterbach, et al. filed on Jan. 9, 2014, the disclosure of which is incorporated by reference herein.

BACKGROUND

The current energy policies around the world have encouraged the development of renewable, clean and sustainable chemicals in an effort to reduce greenhouse emissions. The conversion of sustainable biomass for the production of energy and high value chemicals has been proposed as an enabling technology and received a great deal of interest for decades. From a technical perspective, chemicals extracted from biomass require fewer steps, are more amenable to aqueous processing, and generate less waste than their oil-based counterparts. Thereby, various biomass feed stocks such as cellulosic plants, algae, triglyceride plants, and rubber plants have been suggested as precursors to produce biochemicals and biofuels (diesel, gasoline or ethanol). However, to the best of our knowledge, none of these technologies offer an efficient process for the production of liquefied petroleum gas (LPG) from biomass.

LPG is composed of low-C hydrocarbons (e.g., lightweight $C_3$ and $C_4$ compounds) and is a versatile fuel that can be used for heating, cooking, and power generation. Furthermore, LPG storage and transportation technology is mature and is prevalent amongst industrial, commercial, and consumer processes. Using LPG creates significantly lower harmful emissions, such as carbon dioxide ($CO_2$), than using gasoline or diesel. Therefore, LPG obtained from sustainable biomass feed stocks can provide clean energy.

Current proposed technologies for the production of LPG from biomass involves using synthesis gas (carbon monoxide (CO)+hydrogen ($H_2$)) as an intermediate, which can be obtained by the gasification of cellulosic biomass (i.e. woody chips and agricultural wastes). The synthesis gas is then converted to LPG using catalytic processes at a high temperature (>700° C.) and pressure (up to 20 bar). The products and byproducts obtained from the catalytic process require multiple separation steps, which increase the capital and operation costs of the LPG production. On the other hand, biomass derivatives (e.g. platform chemical mixture) can be converted into high value chemicals and hydrocarbon fuels by catalytic routes. An example of high-value biochemical production includes aromatic hydrocarbons (benzene, toluene, xylenes (BTX), etc.), which could be produced from solid biomass via fast pyrolysis techniques or thermal deoxygenation. However, to the best of our knowledge, production of biomass-derived LPG (bio-LPG) and bioaromatics requires high operating temperatures and complex separation processes due to the low product yield.

SUMMARY

Objects and advantages of the invention will be set forth in part in the following description, or may be obvious from the description, or may be learned through practice of the invention.

Methods are generally provided for deriving a low-C hydrocarbon fuel from a platform chemical mixture. In one embodiment, the method comprises: introducing the platform chemical mixture to a catalytic material to produce a product stream comprising a low-C hydrocarbon fuel, and separating the low-C hydrocarbon fuel in the product stream from any remaining platform chemicals.

Methods are also generally provided for producing aromatic hydrocarbons benzene, toluene, and xylenes from a platform chemical mixture. In one embodiment, the method comprises introducing a catalytic material to the platform chemical mixture to produce a immiscible liquid product stream comprising BTX, and separating the BTX in the liquid product stream from unreacted platform chemicals via a decanting process.

In these embodiments, the platform chemical mixture comprises a mixture of aliphatic organic compounds, and the catalytic material comprises an aluminosilicate zeolite material.

Other features and aspects of the present invention are discussed in greater detail below.

DEFINITIONS

As used herein, the term "low-C hydrocarbon fuel" refers to a mixture of hydrocarbons having carbon chains that contain 1 to 5 carbon atoms per molecule, such as 2 to 4 carbon atoms per molecule, including but not limited to alkanes (e.g., ethane, propane, butane, pentane), alkenes (e.g., ethylene, propylene, butylene), etc. For example, "low-C hydrocarbon fuel" can refer to liquefied petroleum gas, which is a mixture primarily of propane and butane, but may also contain small amounts of propylene and/or butylene as well as other low-C hydrocarbons.

The terms "aromatic" and "aromatic compound" are used herein to refer to a class of chemical compounds containing a conjugated planar ring system(s) with delocalized pi electron clouds and generally follows Hückel's rule. For example, "aromatic compounds" include, but are not limited to, compounds that contain at least one 6-carbon-based ring with conjugated double bonds around its perimeter, but may also include methylated (e.g., toluene, xylenes, etc.), ethylated (e.g., ethylbenzene, etc.), and methyl-ethylated (e.g., methylethyl benzene, etc.) derivatives. For example, aromatic compounds include, but are not limited to, benzene and its derivatives (e.g., toluene, xylenes, ethylbenzene, etc.).

As used herein, the term "substantially free" means no more than an insignificant trace amount present and encompasses completely free (e.g., 0 molar % up to 0.01 molar %).

It is to be understood that the ranges and limits mentioned herein include all ranges located within the prescribed limits (i.e., subranges). For instance, a range from about 100 to about 200 also includes ranges from 110 to 150, 170 to 190, 153 to 162, and 145.3 to 149.6. Further, a limit of up to about 7 also includes a limit of up to about 5, up to 3, and up to about 4.5, as well as ranges within the limit, such as from about 1 to about 5, and from about 3.2 to about 6.5.

BRIEF DESCRIPTION OF THE FIGURES

A full and enabling disclosure of the present invention, including the best mode thereof to one skilled in the art, is set forth more particularly in the remainder of the specification, which includes reference to the accompanying figures.

DETAILED DESCRIPTION

Figure 1:
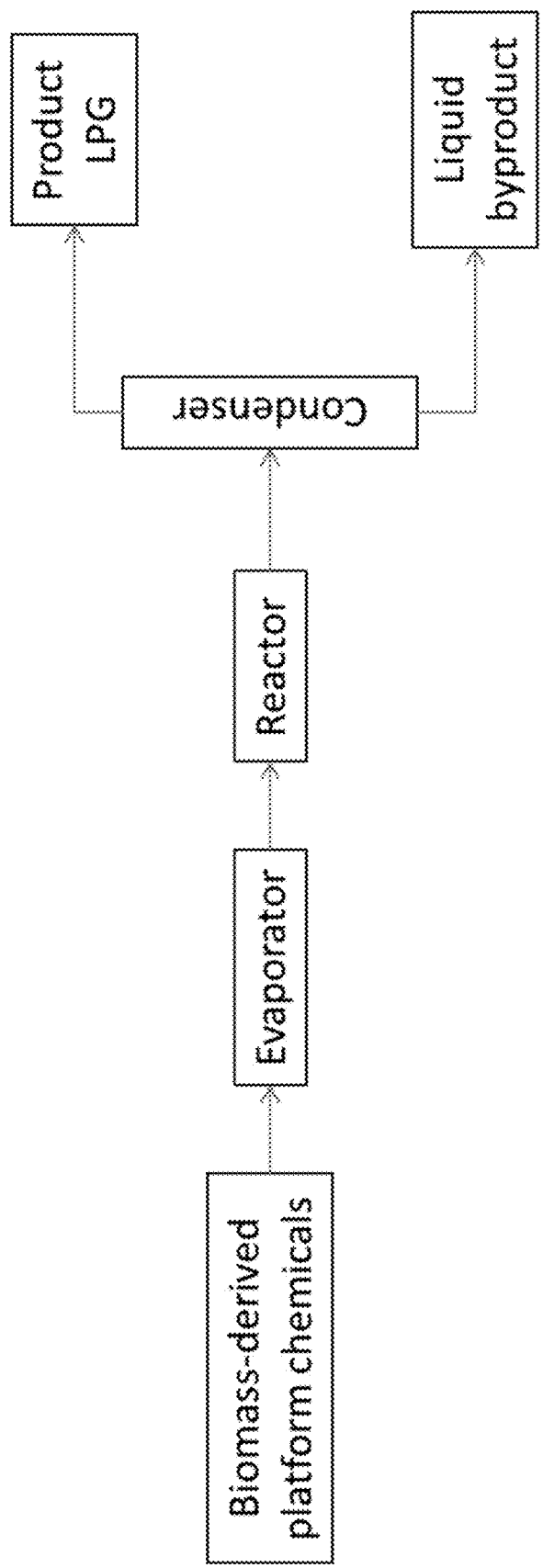
FIG. 1 shows an exemplary system suitable for conversion of a platform chemical mixture to a low-C hydrocarbon fuel.

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

The present invention offers a simple low-temperature and low-pressure process for producing bio-LPG and bio-aromatics via platform chemical intermediates, which can be obtained from abundantly available non-food lignocellulose or starch-based biomass.

Efficient methods are generally provided to convert a platform chemical mixture into LPG and BTX (i.e., mixtures of benzene, toluene, and the three xylene isomers) in one-step. Through these methods, renewable and inexpensive plant biomass can be transformed into platform chemicals and fuels. The bio-LPG produced from platform chemicals is a sustainable energy resource and can be used as a fuel for heating, cooking, and power generation. As such, energy derived from biomass can be truly sustainable. The methods of bio-LPG production described herein is generally more energy efficient and generates significantly less greenhouse gas emissions than fuels produced from conventional petroleum products. Furthermore, the liquid byproducts of the catalytic reaction described herein include aromatic compounds, which are chemicals used in common organic synthesis, purification, and extraction processes.

I. Platform Chemicals

The rapid growth and enormous potential of the biomass processing industry alludes to the possibility of substituting petroleum-derived chemicals with sustainably produced analogs. An estimated 1.3 trillion kg of dry biomass could be sustainably produced per year; this is without significantly altering the food, export/import, or durable goods markets.

Generally, the platform chemical mixture is a mixture of aliphatic organic compounds recovered from a natural source or biomass. For example, the platform chemical mixture can be obtained from lignocellulose and starch based plants, triglyceride plants (e.g., vegetable oil), algae, terpenes and rubber plants, etc. The platform chemical mixture is generally free from aromatic organic compounds. That is, the platform chemical mixture is, in certain embodiments, at least about 95% by weight aliphatic organic compounds with less than about 5% by weight aromatic compounds present. In one embodiment, the platform chemical mixture is at least about 99% by weight aliphatic organic compounds with less than about 1% by weight aromatic compounds present. For example, the platform chemical mixture can be, in one particular embodiment, substantially free from aromatic organic compounds.

The platform chemical mixture obtained from biomass feedstocks, with a high conversion efficiency, can include, but are not limited to, furfurals (e.g., 2-furaldehyde, 5-hydroxymethylfurfural, etc.), furfural derivatives (e.g., furfuryl alcohol, methylfuran, tetrahydrofurfuryl alcohol, hydroxylmethylfurfural (HMF), 2-methlyhydrofuran, 2-methyltetrahydrofuran, tetrahydrofuran-5-dimethanol, furoic acid, 1,5-pentanediol (PDL), 1,2-pentanediol, 1,4-pentanediol, etc.), levulinic acid, derivatives of levulinic acid (e.g., angelica lactone, levulinic acid esters, γ-valerolactone (GVL), methyltetrahydrofuran (MTHF), 1,4-butanediol, succinic acid, formic acid, 1-pentanol, and 2-pentanol)), or mixtures thereof.

Furfural is a useful product made by the dehydration of pentoses, which are in high concentrations in lignocellulosic and hemicellulosic biowastes. Furfural, which is produced at nearly 300 million kg/yr, is used as a solvent and a so-called platform chemical precursor to other useful chemicals such as tetrahydrofuran, furfural alcohol, and PDL. PDL is a specialty chemical that can be derived from the furfural platform chemical in high yields. PDL is used as an additive in synthetic materials or as an intermediate for agrochemical and pharmaceutical products. Industrial suppliers of PDL are located throughout the world.

Levulinic acid (LVA) is another common platform chemical produced from biowaste. The Department of Energy identified LVA as a top value-added chemical due to its versatility as a precursor to many industrially relevant chemicals. As a platform chemical, levulinic acid could be a precursor to LPG.

II. Conversion of Platform Chemicals to Low-C Hydrocarbon Fuel

The platform chemical mixture can be introduced into a plug flow reactor and heated to a reaction temperature of between about 200° C. to about 800° C. Additional gases (e.g., $H_2$, methane ($CH_4$), or a mixture of $H_2$ and $CH_4$) can be introduced into the reactor with the ratio of the platform chemical mixture to the injected gas ranging from 1 to 1000 by volume. The reaction can then proceed in a continuous manner with inflow of platform chemicals and outflow of a product stream (e.g., containing the low-C hydrocarbon fuel, water, and aromatic compounds). In one embodiment, the reaction occurs near atmospheric pressure or above (e.g. between about 660 mmHg and about 76000 mmHg) and can reach steady state within about 15 minutes. The outlet stream generally includes a low-C hydrocarbon fuel (e.g., LPG that resembles $C_3$ and $C_4$ compounds), a residual amount of $C_1$, $C_2$, $C_5$ compounds, a high-C hydrocarbon (i.e., above $C_6$) liquid, water, and unreacted liquid platform chemicals. The low-C hydrocarbon fuel can be separated from the unreacted platform chemicals, water, and aromatic compounds by condensation of the higher boiling point byproducts (i.e., the unreacted platform chemicals and high-C hydrocarbons).

As explained above, the low-C hydrocarbon fuel can include various concentrations of any or all of the following components: methane, ethylene, ethane, propylene, propane, 1-butene, n-butane, iso-butane, etc.

Platform chemical cracking generally requires solid acid catalysts, such as silicas, aluminas, zeolites, or mixtures thereof. Zeolite materials are high surface area supports that have a high activity for many reforming reactions. In one particular embodiment, the zeolite material can be a mixture of alumina and silica having a Si/Al ratio selected to control the total acidity as well as acid site strength, pore size, activity and stability. Such zeolites can be prepared by mixing sodium aluminate and sodium silicate, followed by controlled crystallization, usually in the presence of a structure-directing template. Syntheses often must be prepared in hydrothermal conditions at elevated pressure. They can also be easily cation exchanged. Variation of the alumina and silica contents can alter the properties of these materials and tailor their activity for different reactions. Specifically, activity and stability of the catalysts are affected by the silica-to-alumina molar ratio present in the structure. In particular embodiments, the silica to alumina molar ratio can be from about 5 to about 200, such as about 20 to about 200.

The catalytic material can also include a relatively small amount of a precious metal or a combination of precious metals. Incorporation of various metal atoms into the framework of these materials via an ion-exchange process or impregnation process can yield improved performance. For instance, metal atoms doped in this way can include aluminum (Al), cerium (Ce), copper (Cu), europium (Eu), iron (Fe), gallium (Ga), gadolinium (Gd), indium (In), iridium (Ir), lanthanum (La), sodium (Na), neodymium (Nd), nickel (Ni), palladium (Pd), praseodymium (Pr), platinum (Pt), rhodium (Rh), ruthenium (Ru), samarium (Sm), zinc (Zn), zirconium (Zr), or mixtures thereof. The metal can be incorporated into the zeolite framework in a weight percent of about 0.1% to about 50% of the total weight of the catalytic material (e.g., the weight of the zeolite(s) and the precious metal(s)), such as about 0.1% to about 20%. For instance, in particular embodiments the precious metal(s) can be included in the catalytic material in a weight percent of about 0.5% to about 10% of the total weight of the catalytic material.

During the cracking reactions, the catalyst may suffer from rapid deactivation and low activities. Degradation in catalytic activity can be recovered by applying oxidative regeneration cycles using an oxygen containing gas (e.g., ambient air, pure oxygen ($O_2$), etc.) between about 200° C. to about 800° C., such as about 300° C. to about 700° C.

In particular embodiments of the present invention, the platform chemical mixture is evaporated and injected to a catalyst bed having a temperature of between about 300° C. to about 600° C. The catalyst materials can include, in one particular embodiment, zeolite materials with mordenite framework inverted (MFI), chabazite (CHA) or faujasite structures. For example, exemplary catalyst materials that may be suitable are disclosed in U.S. Publication No. 2013/0041198 of Lauterbach, et al. titled "Highly Active Decomposition Catalyst for Low Carbon Hydrocarbon Production from Sulfur Containing Fuel" filed on Aug. 13, 2012, which is incorporated by reference herein.

In certain embodiments, the yield of the platform chemical mixture to LPG mixture can be up to 50 wt %, calculated on a mass basis, i.e., kg of low-C hydrocarbons out per kg of platform chemical mixture in, which may be increased further with the optimization of reaction conditions. At least 60% of the low-C hydrocarbons in the desired product gas can be, in particular embodiments, hydrocarbons having 3 carbons.

In certain embodiments, the yield of the platform chemical mixture to bioaromatics can be up to 70 wt %, calculated on a mass basis, i.e., kg of bioaromatics out per kg of platform chemical mixture in, which may be increased further with the optimization of reaction conditions. At least 40 wt % of the bioaromatics in the desired liquid product can be, in particular embodiments, benzene and derivatives thereof.

As stated, the product stream from the reactor can be cooled down, such as to a condensation temperature between about −10° C. to about 20° C., so as to liquefy any unreacted platform chemicals and high-C hydrocarbons. The low-C hydrocarbon fuel remains in the gas state and can be separated as the desired product. Both the unreacted platform chemicals and high-C hydrocarbons can be continuously recycled back to the reactor for further cracking. Conversely, the aromatic compounds can be separated by a simple decanting process due to their immiscibility with the platform chemicals in water.

III. Reactor

In one particular embodiment, the platform chemical mixture can be introduced into a reactor, along with the catalyst material (e.g., the zeolite and optional metal) and heated to a reaction temperature of between about 200° C. and about 800° C., such as about 300° C. to about 700° C.

The reaction can proceed within the reactor in a continuous manner with inflow of platform chemicals and outflow of a product stream containing the low-C hydrocarbon fuel. The reaction occurs near atmospheric pressure (e.g., within about 100 mmHg of 760 mmHg) and can reach steady state in a short amount of time (e.g., less than about 15 minutes).

The low-C hydrocarbon fuel can then be separated from any remaining platform chemicals, high-C hydrocarbons, and/or the catalytic material in the product stream. For example, the low-C hydrocarbon fuel can be separated from any remaining high-C hydrocarbon fuel and/or platform chemicals using a condensation process. In one embodiment of a condensation process, the product stream (i.e., the low-C hydrocarbon fuel) from the reactor is cooled to a condensation temperature where any high-C hydrocarbon and/or any remaining platform chemicals liquefies. The low-C hydrocarbon fuel remains gaseous and passes through a condenser to remove any unreacted high-C hydrocarbons as liquid waste. For example, the condensation temperature can be about −10° C. to about 20° C., such as 0° C. to about 10° C. (e.g., less than about 8° C.). At these conditions, the low-C hydrocarbon fuel remains in the gas state and can be separated as the desired product.

Any suitable reaction/condensation system can be utilized to perform this method, such as the system discussed in U.S. Provisional Patent Application Ser. No. 61/881,514 of Lauterbach, et al. titled "Flexible Fuel Converter for Producing Liquefied Petroleum Gas from Transportation Fuels" filed on Sep. 24, 2013, which is incorporated by reference herein.

EXAMPLES

Described herein is the transformation of 1,5-PDL to LPG and aromatic hydrocarbon products. An efficient method to produce LPG and BTX compounds via a one-step catalytic reaction was demonstrated.

FIG. 1 shows a diagram of the experimental setup. In this particular embodiment, 1,5-PDL and 50 standard cubic centimeter per minute (SCCM) of helium were introduced into an evaporator at a temperature enough to gasify liquid 1,5-PDL. The gas mixture was then passed through the MFI-loaded catalyst bed, with a weight hourly space velocity (WHSV) of 2 $h^{-1}$. The reaction occurred near atmospheric pressure and the reaction temperature was screened from 325° C. to 550° C. The outlet stream from the reactor flowed through a condenser in which the low C-hydrocarbon was separated from aromatic hydrocarbons and other liquid byproducts.

Figure 2:
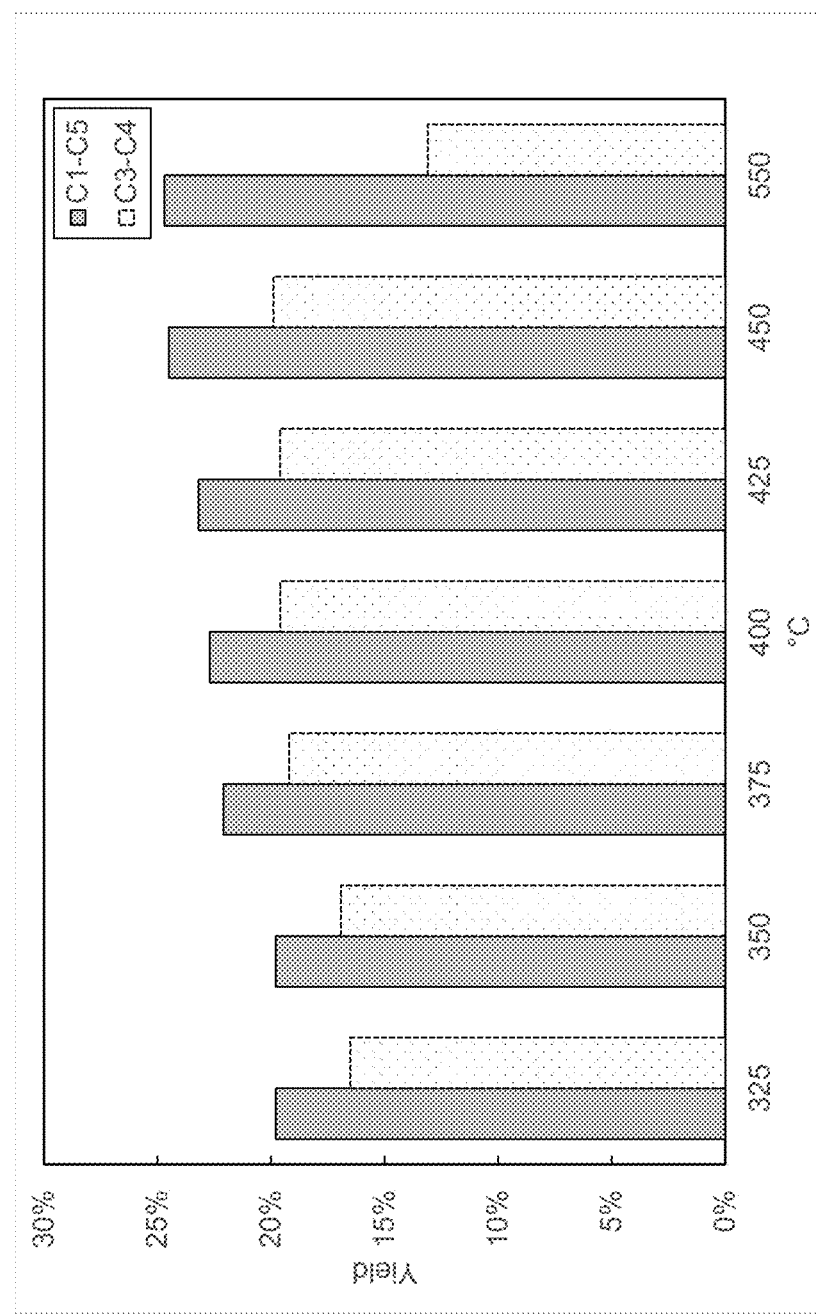
FIG. 2 shows the yield of seven conversion processes conducted at various temperatures.
Figure 3:
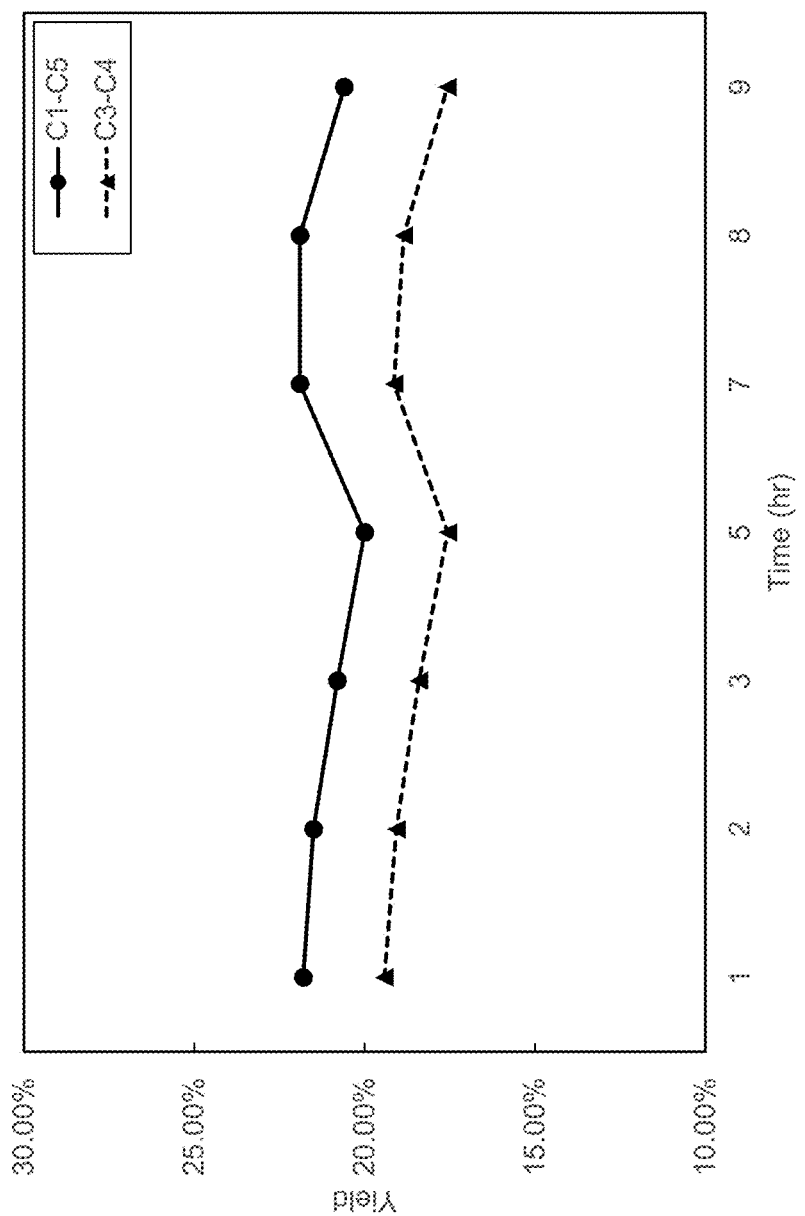
FIG. 3 shows results of conversion processes conducted at 375° C. for varying time of reactions (1-9 hours)
Figure 4:
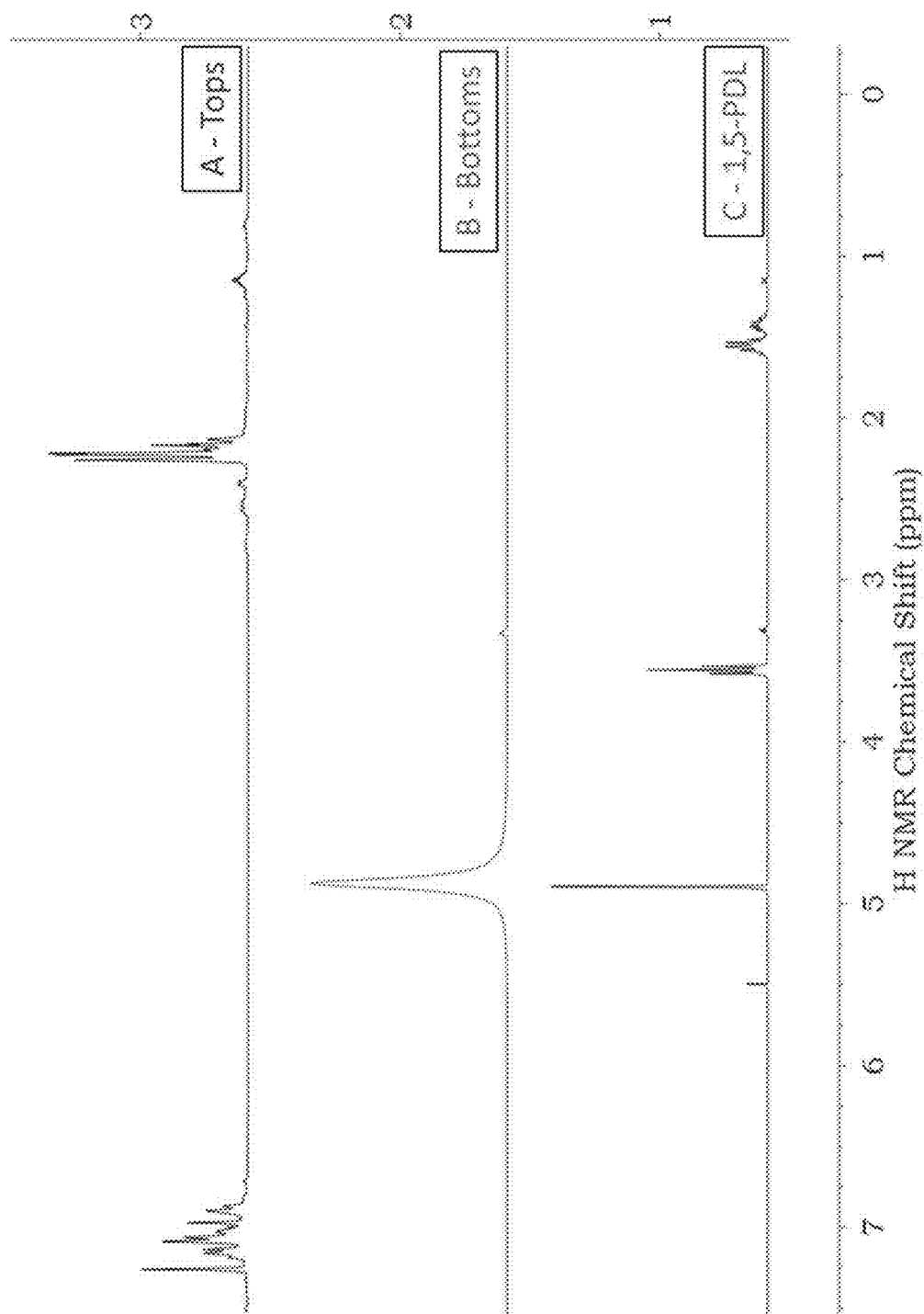
FIG. 4 contains $^1$H nuclear magnetic resonance spectra of [A] hydrocarbon top liquid phase product, [B] aqueous bottom liquid phase product, and [C] 1,5-PDL reactant.

The composition of the low-C hydrocarbon product was analyzed by gas chromatography (GC) and the spectrum is shown in FIG. 2. The yield of $C_1$-$C_5$ compounds was found to increase with the temperature, reaching up to 24.5% at 450° C. At temperatures above 450° C., the yield of $C_1$-$C_5$ compounds did not indicate a significant change and remained near 24.7% at 550° C. However, the yield of LPG ($C_3$ and $C_4$ compounds) was found to decrease dramatically to 13.1% above 450° C., while remaining above 19.2% between 375° C. and 450° C. Because higher operating temperatures would require more energy input and may contribute to catalyst degradation, 375° C. was chosen for time on stream (TOS) experiments. 1,5-PDL was used as a representative reactant (FIG. 3) to demonstrate the stability of the catalyst material. For example, the low-C hydrocarbon and LPG yields, for the reaction temperature 375° C., were found to be 21.8% and 19.4% at one hour TOS and 21.8% and 18.9% at eight hour TOS, respectively. The two-phase immiscible liquid product, which was collected after the TOS experiment, was analyzed by $^1$H nuclear magnetic resonance spectroscopy (NMR) and gas chromatography-mass spectrometry (GC-MS). NMR indicated that the two-phase immiscible liquid product contained an aqueous phase (bottoms) and an organic phase (tops). The organic phase (FIG. 4A) was analyzed in deuterated chloroform; the spectrum exhibited characteristic chemical shifts (6.5-7.5 ppm) for aromatic compounds, such as BTX (FIG. 4B). The aqueous phase (FIG. 4B) was analyzed in deuterated methanol; the spectrum exhibited a large peak associated with water (4.87 ppm) and exhibited negligible amounts of unreacted 1,5-PDL (FIG. 4C); the aqueous phase was substantially free of 1,5-PDL. The peak near 3.31 ppm is from residual non-deuterated methanol. Further characterization by GC-MS determined that the organic phase consisted mostly of BTX and ethylbenzene. The yield of benzene, toluene, and xylenes are 3.5%, 22.2%, and 12.0%, respectively.

These and other modifications and variations to the present invention may be practiced by those of ordinary skill in the art, without departing from the spirit and scope of the present invention, which is more particularly set forth in the appended claims. In addition, it should be understood that the aspects of the various embodiments may be interchanged, either in whole or in part. Furthermore, those of ordinary skill in the art will appreciate that the foregoing description is by way of example only, and is not intended to limit the invention so further described in the appended claims.

The invention claimed is:

1. A method for deriving a low-C hydrocarbon fuel from a platform chemical mixture, the method comprising:
providing a platform chemical mixture comprising a mixture of aliphatic organic compounds;
evaporating the platform chemical mixture;
thereafter, introducing the evaporated platform chemical mixture to a catalytic material, at a reaction temperature of between about 375° C. and about 450° C. and a reaction pressure of from about 660 mmHg to about 860 mmHg to produce a product stream comprising a low-C hydrocarbon fuel, wherein the catalytic material comprises an aluminosilicate zeolite material, wherein the aluminosilicate zeolite material has a mordenite framework inverted structure having a silica to alumina molar ratio of from 20 to 200; and
separating the low-C hydrocarbon fuel in the product stream from unreacted platform chemicals, wherein the low-C hydrocarbon fuel comprises liquefied petroleum gas consisting of $C_3$ and $C_4$ compounds, wherein the $C_3$ and $C_4$ compounds are present at a yield above 19.2% based on the mass of the platform chemical mixture.

2. The method as in claim 1, further comprising:
introducing a gas to the catalytic material and the platform chemical mixture.

3. The method as in claim 2, wherein the gas and the platform chemical mixture are mixed prior to introducing to the catalytic material.

4. The method as in claim 2, wherein the gas and the platform chemical are simultaneously introduced to the catalytic material.

5. The method as in claim 2, wherein the gas comprises $H_2$, methane, or a mixture of $H_2$ and $CH_4$.

6. The method as in claim 1, wherein the low-C hydrocarbon fuel is produced from the platform chemical mixture in a reactor that includes the catalytic material.

7. The method as in claim 6, wherein the platform chemical mixture is introduced into the reactor as a continuous inflow, stream, and wherein a continuous outflow of the product stream exits the reactor.

8. The method as in claim 1, wherein the low-C hydrocarbon fuel is separated from any remaining platform chemical mixture in the product stream through a condensation process.

9. The method as in claim 8, wherein the condensation process comprises:
cooling the product stream to a condensation temperature where any remaining platform chemical mixture liquefy while the low-C hydrocarbon fuel remains gaseous; and
collecting the low-C hydrocarbon fuel.

10. The method as in claim 9, wherein the condensation temperature is about −10° C. to about 20° C.

11. The method as in claim 1, wherein the catalytic material further comprises a metal comprising Al, Ce, Cu, Eu, Fe, Ga, Gd, In, Ir, La, Na, Nd, Ni, Pd, Pr, Pt, Rh, Ru, Sm, Zn, Zr, or mixtures thereof.

12. The method as in claim 11, wherein the metal is included in the catalytic material in a weight percent of about 0.1% to about 50% of the total weight of the catalytic material.

13. The method as in claim 1, wherein the platform chemical mixture comprises at least about 95% aliphatic organic compounds and less than about 5% aromatic compounds.

14. The method as in claim 1, wherein the platform chemical mixture is substantially free from any aromatic organic compounds.

15. The method as in claim 1, wherein the platform chemical mixture comprises furfurals, furfural derivatives, levulinic acid, derivatives of levulinic acid, or a mixture thereof.

* * * * *